Figure 1:
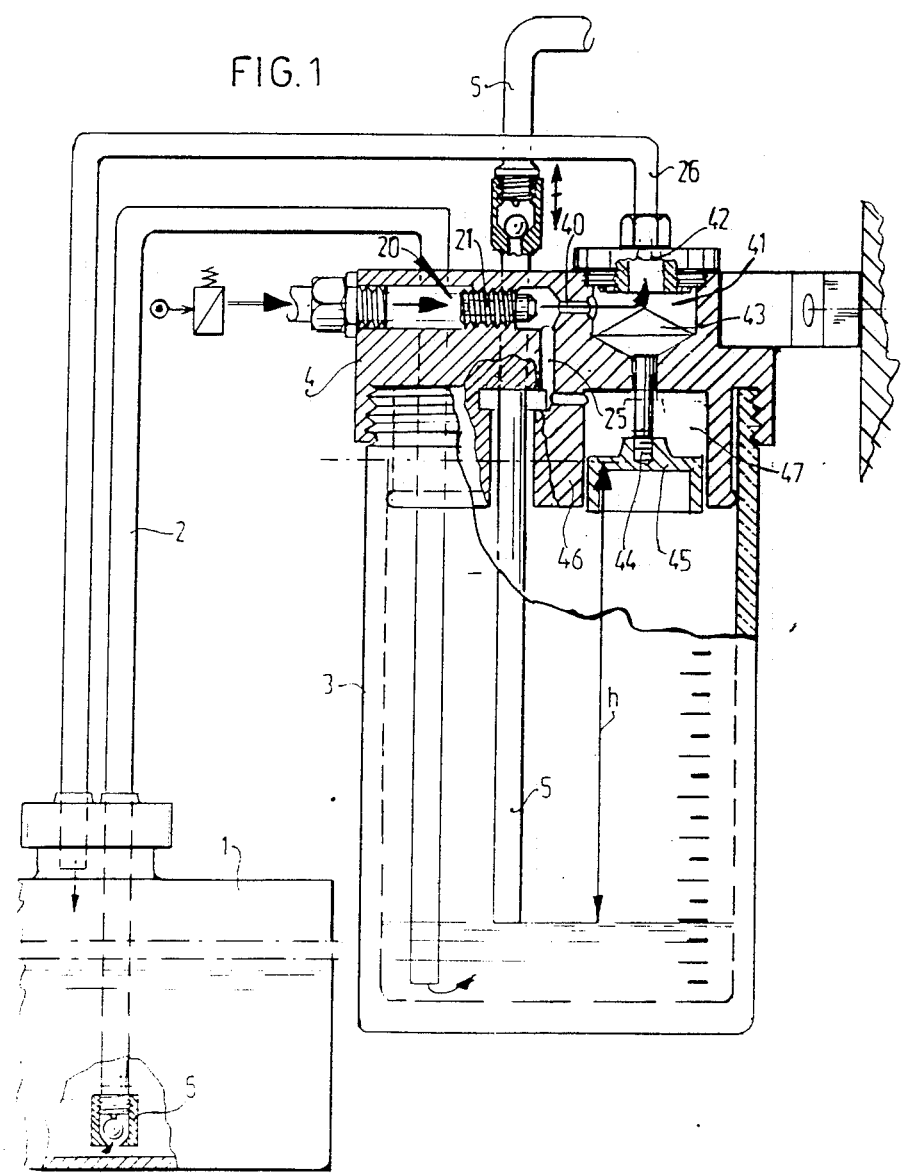

United States Patent [19]

Vanderheyden

[11] Patent Number: 4,964,784
[45] Date of Patent: Oct. 23, 1990

[54] VOLUMETRIC DOSING APPARATUS

[76] Inventor: Herman Vanderheyden, 24 Rostijnedreef, 9880 Aalter, Belgium

[21] Appl. No.: 77,172

[22] Filed: Jul. 24, 1987

Related U.S. Application Data

[63] Continuation of Ser. No. 768,438, Aug. 22, 1985, abandoned.

[51] Int. Cl.⁵ .............................................. F04B 23/14
[52] U.S. Cl. ...................................... 417/86; 417/126; 222/17
[58] Field of Search ..................... 417/85–87, 417/138, 145, 148, 149, 126, 131; 222/17, 21, 61, 373, 382

[56] References Cited

U.S. PATENT DOCUMENTS

| | | | |
|---|---|---|---|
| 1,133,040 | 3/1915 | Koerting | 417/86 X |
| 1,485,705 | 3/1924 | Piel | 417/148 X |
| 2,141,427 | 12/1938 | Bryant | 417/148 X |
| 3,051,195 | 8/1962 | Stenberg | 417/148 X |
| 3,320,970 | 5/1967 | McHenry | 417/138 X |
| 3,357,365 | 12/1967 | Golay | 417/126 |
| 3,602,607 | 8/1971 | Hodges | 417/148 |

FOREIGN PATENT DOCUMENTS

| | | | |
|---|---|---|---|
| 70680 | 2/1950 | Denmark | 417/149 |
| 691510 | 5/1940 | Fed. Rep. of Germany | 417/148 |
| 822651 | 11/1951 | Fed. Rep. of Germany | 417/149 |
| 753918 | 6/1952 | Fed. Rep. of Germany | 417/149 |
| 716163 | 10/1931 | France | 417/149 |
| 1107890 | 8/1955 | France | 417/149 |
| 642706 | 7/1962 | Italy | 417/149 |
| 28740 | 8/1971 | Japan | 417/148 |
| 26625 | 8/1902 | Switzerland | 417/148 |
| 492078 | 9/1938 | United Kingdom | 417/149 |

Primary Examiner—Leonard E. Smith
Assistant Examiner—Robert N. Blackmon
Attorney, Agent, or Firm—Watson, Cole, Grindle & Watson

[57] ABSTRACT

A system for dispensing a liquid, which may be corrosive, in an amount which is substantially fixed for each cycle of operation includes an airtight measuring vessel with an inlet conduit through which liquid is introduced unidirectionally and an outlet or discharge conduit through which the measured amount of liquid is dispensed. The outlet conduit extends to a predetermined level within the vessel and above it is a float/valve mechanism operating in association with an airjet pump. The operation is such that when the float is buoyed to an operative level higher than the predetermined level, conditions are changed within the vessel to commence the dispensing cycle which terminates when the level of liquid falls below the predetermined level whereupon the float/valve drops to an unbuoyed position to commence the next filling cycle. Operation of the jet pump is required during cycling to cooperate with the float/valve mechanism and create the conditions necessary for filling and for dispensing.

17 Claims, 2 Drawing Sheets

VOLUMETRIC DOSING APPARATUS

This application is a continuation of Ser. No. 768,438, filed 08/22/85 and now abandoned.

The invention relates to an apparatus for the volumetric dosing of a liquid, consisting of a reservoir for that liquid, an air-tight measuring vessel for temporary receiving a predetermined volume of liquid, the vessel being connected to the reservoir by a first conduit, a second outlet conduit connected to the measuring vessel, a pump means to obtain a subatmospheric pressure in said vessel, and a third conduit connected to the measuring vessel, having a valve chamber, containing a valve body, actuated by a float, and so adapted to close off said third conduit.

There are many volumetric dosing devices known in the art, having the disadvantage that either the dosing must take place manually, i.e. at each operation the user has to check whether the measuring vessel contains the correct quantity of liquid and then stop the inflow of liquid, or a complicated control apparatus is required which takes over the above function from the user. The control apparatus can be attacked, particularly by aggressive liquids such as bleach.

The aim of the invention is to provide a dosing apparatus of the type mentioned above, which as well as offering great accuracy, keeps working reliably even when used for aggressive liquids, and is also simple and inexpensive to manufacture.

The apparatus according to the invention is distinguished in that the valve body and the float are mutually coupled by a connecting means such that the distance between them is substantially constant.

The invention employs the application of pressure differences in the measuring vessel to transport the liquid in and out of the measuring vessel. By this means it is possible to keep the pumping and the control apparatus entirely separated from the liquid circuit, whereby the apparatus is protected from the aggressive action of the liquid. The dosing apparatus can thus be made inexpensively, because only a limited number of components, namely the supply and outlet conduits and the measuring vessel itself, come into contact with the liquid. The dosing is accurate because only the evacuation time, determined by the float is of importance. Said valve is connected to said float incorporated in the measuring vessel. The valve is thus directly controlled by the level of the liquid acting on the vertically moveable float, which movement is transmitted to the valve.

In an embodiment the above mentioned means of pumping are preferably embodied as a pneumatic pump of the jet-tube type, the pump being provided with a channel connected to the measuring vessel which functions as a vacuum/pressure conduit, and said third conduit incorporating a controlled valve element for closing off that channel. With this arrangement it is extremely simple to alternately evacuate and pressurize the measuring vessel, because the valve in the outlet channel merely has to be opened or closed respectively.

The required dosing of the liquid in the measuring vessel can be brought about by providing the outlet conduit from the measuring vessel with a riser which is vertically slidable through the cover of the measuring vessel. By causing the riser to project to a greater or lesser depth into the measuring vessel, a correspondingly larger or lesser quantity of liquid is delivered in each dosing operation.

The above mentioned and other characteristics of the invention will be clarified in the detailed description herebelow of some embodiments.

Figure 2:
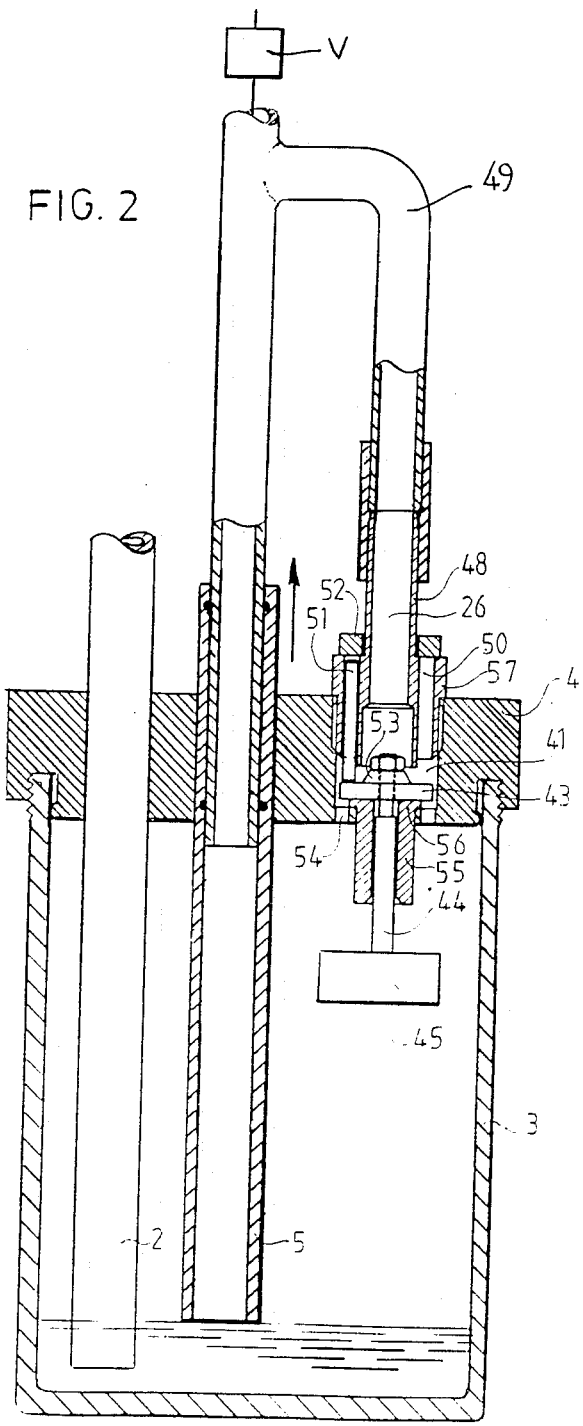

In the drawings:

FIG. 1 shows a schematic overview of a first embodiment of the apparatus according to the invention, FIG. 2 shows a second embodiment of the apparatus according to the invention.

The apparatus according to FIG. 1 consists of a reservoir 1, in which the liquid to be dosed out is stored. This reservoir can, for example, be the commercial packaging, whereby a suitable provision must be made such that a first conduit 2 having a one-way valve 6, can be led to the bottom of the reservoir 1. Conduit 2 leads to a measuring vessel 3, which is completely air-tight. The measuring vessel is provided, at the upper end, with a closure, for example detachable cover 4, which incorporates a number of bushes, one of which is receiving the other end of conduit 2. The lower end of conduit 2 is preferably brought to just above the bottom of the measuring vessel 3, in order to ensure a uniform inflow of liquid into measuring vessel 3, which prevents foaming.

A second bush serves for the second outlet conduit 5, which is adjustable in a vertical direction, a feature which will be further explained below. The outlet conduit 5 leads to an arbitrary machine like a washing machine where the determined quantity of liquid is needed.

In the drawing is to be seen that the pneumatic jet-pump 20 is incorporated in the cover 4, which is screwed onto the measuring vessel 3. In this case the channels for the air-pump are drilled into the material of cover 4, and the only separate component is jet-tube 21, fitted in the drilling. Opposite the drilling is a narrow connecting channel 40, leading to the valve chamber 41. The upper side of the valve chamber is provided with an outlet opening 42, which is connected to a third conduit 26. Valve 43 can be moved up and down such that in the raised position opening 42 can be closed off. The valve body 43 has a double frusto conical form cooperating with a conical seat at the lower side in order to create a tight seal. The upper side of the valve body 43 cooperates with an annular seal of a relatively wide diameter in order to create sufficient upwardly directed pressure forces to balance the weight of the valve and the connected float. Fitted to the valve 43 there is a stem, 44, connected to float 45. Cover 4 is so executed that it presents a portion 46, which projects into the space of measuring vessel 3, and in which a recess is formed for accomodating float 45.

The operation of the device illustrated in FIG. 1, starting from the initial condition wherein the measuring vessel 3 is empty, is that, with the pump which supplies pressurized air in operation (on), the flow of air through the nozzle 21 into the chamber C will draw air from the interior of the measuring vessel 3 through the first air passage means 25 and outwardly thereof through the second air passage means 40 to feed pressurized air into the interior of the reservoir 1 through the third conduit 26. Thus, the interior of the measuring vessel 3 will be subjected to negative pressure through the first air passage means 25 while the interior of the reservoir 1 is being subjected to pressure in excess of atmospheric pressure through the second air passage means 40 and the third conduit 26. This causes liquid to flow from the reservoir unidirectionally through the first conduit 2 and into the measuring vessel 3 at a point near the bottom thereof. The level of the liquid in the measuring vessel 3 therefore rises while that in the reservoir 1 lowers.

At this point, it should be noted that if the height h were great enough with relation to the maximum pressure being supplied to the nozzle, the liquid level in the measuring vessel 3 could not reach the level of the float because of the increasing hydrostatic head at the point P. Thus, the height h is sufficiently small in relation to the maximum pressure being supplied to the nozzle 21 as to allow the liquid level in the measuring vessel to rise through the height h and operate the float 45 and its valve 43.

When the liquid has risen to a level in the measuring vessel which begins to buoy the float 45, the decreased area represented by the float chamber space 47 causes the float to rise rapidly with the rising liquid level. When the float valve body 43 closes the opening 42, the pressure in the interior of the measuring vessel rapidly rises toward the maximum pressure being supplied to the nozzle and liquid commences unidirectional flow from the measuring vessel through the second conduit 5 while the level of liquid in the measuring vessel 3 lowers. Ultimately, the liquid level lowers to the point P and vents the interior of the measuring vessel to atmospheric pressure through the conduit 5. The valve body 43 will remain in closing relation to the opening 42 so long as pressurized air is supplied into the measuring vessel by the pump. When the pump is turned off, thus discontinuing the flow of pressurized air into the measuring vessel, the interior of the measuring vessel will return to atmospheric pressure and the valve body 43 will drop. The filling/discharge cycle can be commenced again when the pump is again turned on.

Thus, it will be seen that the apparatus according to the invention concerns a liquid dosing device including an airtight measuring vessel 3 having a bottom and a top or cover 5. The discharge conduit means 5 communicates at a predetermined level L within the measuring vessel between the bottom and the top for dispensing liquid from the measuring vessel and thereby depleting any supply of liquid therein. The apparatus is also provided with inlet conduit means 2 for filling the measuring vessel with a supply of liquid and the float valve means 43 within the measuring vessel movable between unbuoyed and buoyed positions and located above the predetermined level L for establishing dispensing conditions within the interior of the measuring vessel, thus commencing discharge of liquid therefrom through the discharge conduit means 5, in response to the buoyed position of the float valve means and for establishing filling conditions within the measuring vessel in response to the unbuoyed position of the float valve mans. Lastly, there is the pneumatic pressure flow means for subjecting the interior of the measuring vessel tot eh filling conditions in response to the unbuoyed position of the float valve means and for subjecting the interior of the measuring means to the dispensing conditions in response to the buoyed position of the float means.

The non-return valves in inflow conduit 2 and outlet conduit 5 ensure, in all embodiments, that no undesired counterflows of liquid occur.

Turning now to FIG. 2 the embodiment as shown is provided with the same reference numerals for the same items as in the embodiment as described above.

So the measuring vessel 3 is also provided with an air-tight cover 4, provided with orifices to take up a first conduit 2, connected to the reservoir 1 (not shown).

The second conduit 5 is also adapted to be slidably adjusted with respect to cover 4.

The pump means for creating a vacuum in vessel 3 is here connected to the second conduit 5 directly. The pump means itself are not shown, but may be a part of a vacuum system connected to conduit 5.

The third conduit 26 is also provided with a valve chamber 41 in which a valve body 43 is able to be moved over a certain vertical distance.

The valve body is through stem 44 connected to a float 45 similar to the embodiment according to FIG. 1.

The valve body 43 and stem 44 is guided in a bushing 55, having a collar 46 resting upon the bottom of chamber 41.

The upper side of chamber 41 is closed off by a stop member 57 upwardly extended by a connecting stub 48, to which a flexible hose 49 is connected..The hose 49 leads to the second conduit 5 in order to have the third conduit commmunicating with the vacuum system of conduit 5.

In the stop 57 a number of orifices 50 are provided in each of which is received a pin 51, freely slidable therein. On the top face of stop 57 is provided an annular valve member 52, closing off the upper opening of all orifices 50.

The pins 51 rest at the bottom face upon the annular top face of valve body 43. The top face of valve body 43 is also provided with a frusto conical extension part 53, the conical side of which is adapted to close off the opening of conduit 26.

The valve chamber 41 is permanently in communication with the contents of measuring vessel 3 by orifices 54.

The length of the pins 41 is such that in the lower position of valve body 43 the annular valve 52 will rest upon stop member 57.

The embodiment as described works as follows:

As soon as a vacuum is effected in conduit 5, there will be no communication with the atmospheric pressure outside the vessel 3, so a vacuum will be effected in vessel 3. That means that liquid will be sucked into the vessel via conduit 2.

Even when the liquid reaches the lower opening of conduit 5, there will be still a subatmospheric pressure in the vessel via conduit 26, valve chamber 41 and orifices 54.

As soon as the liquid level reaches the float 45, the float will be pushed upwards until the valve body 43 will close off the lower opening of conduit 26, so breaking the subatmospheric supply in vessel 3. From that moment on the liquid will be sucked via conduit 5 out of the vessel 3 whereupon the level of the liquid will lower.

However the subatmosphereic pressure in conduit 26 still holds the valve body 43 in upwards position closing off the lower opening of conduit 26. Atmospheric pressure is still existing in chamber 41, since the pins 51 will push upwards the annular valve 52, so clearing the openings or orifices 50.

As soon as the liquid level has reached the lower opening of conduit 5, transport of liquid will be stopped.

It will be clear that also here the rate of dosing liquid is related to the distance between the float 43 and lower opening of conduit 5, just as is described in the embodiment according to FIG. 1.

The location of the lower opening of conduit 5 can be adjusted by setting the riser conduit 5 with respect to cover 4.

It will be seen that a principle difference between the embodiments of FIGS. 1 and 2 is in the conditions within the measuring wheel 3 which effect the filling and dispensing. In FIG. 1, the float valve means, in the unbuoyed position thereof, subjects the interior of the vessel 3 to vacuum for the filling condition and the same is true for the FIG. 2 embodiment. In FIG. 1, the buoyed position of the float valve means terminates the filling condition and commences the dispensing condition by subjecting the interior of the vessel to superatmospheric pressure, whereas in FIG. 2, the buoyed position of the float valve means also terminates the filling condition and subjects the interior of the vessel to a less negative pressure (less than in the conduit 5) which effects the dispensing condition.

It will be clear that in the above described embodiments, all pumping and control arrangements remain outside the actual liquid circuit. The entire dosing operation is effectuated by the formation of first underpressure, then overpressure or atmospheric pressure in measuring vessel 3. Leakages of the system have no influence on the loss of liquid by leakage, but cause only air losses, because all potential leakages are situated above the liquid surface in measuring vessel 3.

When the dosing apparatus is applied in washing machines, the delivery of air to pump 20 can take place at the same time as the supply of water into the washing machine. Before the detergent or other liquid such as bleach reaches the laundry-goods, enough water will already have been delivered to the washing machine to prevent damage to the laundry-goods. In any case, it takes some time before measuring vessel 3 has been filled and emptied.

In both embodiments adjustment of the quantity of liquid to be dosed can be carried out simply by moving the riser 5 in a vertical direction.

The invention is not limited to the embodiments described above.

What is claimed is:

1. A liquid dosing device which comprises:
   an airtight measuring vessel having a bottom and a top and defining an interior,
   a liquid inlet conduit means for unidirectionally filling the measuring vessel with a supply of liquid,
   an air bleed conduit means for bleeding air from the measuring vessel as the supply of liquid is introduced into the measuring vessel,
   discharge conduit means which extends into the measuring vessel to communicate at a predetermined level within the measuring vessel between the bottom and the top thereof for dispensing liquid unidirectionally from the measuring vessel until the liquid level in the measuring vessel falls below said predetermined level,
   unitary float valve means located above the predetermined level within the measuring vessel for unitary movement between a lowered, unbuoyed position wherein the air bleed conduit means is open, the unbuoyed position occurring after the liquid level in the measuring vessel has fallen below the predetermined level and the interior is subjected to filling conditions, and a raised, buoyed position wherein the air bleed conduit means is closed, the buoyed position occurring in response to liquid rising in the measuring vessel to a level exceeding the predetermined level, and
   on/off pneumatic pressure flow means for subjecting the interior of the measuring vessel, while on, sequentially to filling and dispensing conditions in response respectively to the lowered, unbuoyed position of the float valve means and to the buoyed position of the float valve means, and when off, allowing the float valve means to drop from its raised position to its lowered position, thereby requiring the pneumatic pressure flow means to be turned on to initiate subsequent sequential filling and dispensing conditions.

2. Apparatus as defined in claim 1 wherein said discharge conduit means is vertically adjustable to vary said predetermined level.

3. Apparatus as defined in claim 1 wherein the filling conditions are internal vacuum within the interior of the measuring vessel.

4. Apparatus as defined in claim 3 wherein the dispensing conditions within the interior of the measuring vessel are internal vacuum therein.

5. Apparatus as defined in claim 3 wherein the dispensing conditions within the measuring vessel are superatmospheric pressure therein.

6. Apparatus as defined in claim 1 wherein the top of the measuring vessel is in the form of a cover, said cover having a downward projection defining a recess of reduced cross-sectional area with respect to the cross-sectional area of the measuring vessel, said unitary float means including a buoyant float portion slidably received in said recess.

7. Apparatus as defined in claim 1 wherein said pneumatic pressure flow means supplies pressurized air to fill the vessel with a supply of liquid, the top of the measuring vessel being in the form of a cover, said cover being provided with a drilled passage intersecting a chamber, said passage being adapted to be connected with a source of pressurized air flow and there being a nozzle in said passage.

8. Apparatus as defined in claim 1 wherein said unitary float valve means moves from buoyed position to unbuoyed position in response to venting of the interior of the measuring vessel through said discharge conduit means.

9. A liquid dosing device comprising the combination of an airtight measuring vessel having a bottom and a top, liquid inlet conduit means for unidirectionally filling the measuring vessel with a supply of liquid to a filled level therein, discharge conduit means communicating at a predetermined level within the measuring vessel between the bottom thereof and said filled level for unidirectionally dispensing that amount of liquid contained between the filled level and the predetermined level and for venting the interior of the measuring vessel when the liquid level falls below said predetermined level, air bleed conduit means for bleeding air from the measuring vessel as the supply of liquid is being introduced thereinto, unitary float valve means located within the measuring vessel above said predetermined level for unitary movement between a raised, buoyed position in response to liquid rising to the filled level and a lowered, unbuoyed position in response to cessation of dispensing conditions within the measuring vessel after it has been filled with liquid to the filled level, to commence filling of the measuring vessel through said inlet conduit means, and pneumatic pressure flow means for subjecting the interior of the measuring vessel to sequential filling and dispensing conditions in response respectively to the unbuoyed position of the float valve means and the buoyed position of the float valve means, the pneumatic pressure flow means retaining the float valve means in the raised, buoyed position at the termination of the dispensing condition so that the pneumatic pressure flow means must be turned off and then on again in order to initiate another cycle of filling and dispensing.

10. Apparatus as defined in claim 9 wherein said discharge conduit means is vertically adjustable to vary said predetermined level.

11. Apparatus as defined in claim 9 wherein the filling conditions are internal vacuum within the interior of the measuring vessel.

12. Apparatus as defined in claim 10 wherein the dispensing conditions within the interior of the measuring vessel are internal vacuum therein.

13. Apparatus as defined in claim 10 wherein the dispensing conditions within the measuring vessel are superatmospheric pressure therein.

14. Apparatus as defined in claim 9 wherein the top of the measuring vessel is in the form of a cover, said cover having a downward projection defining a recess of reduced cross-sectional area with respect to the cross-sectional area of the measuring vessel, said unitary float means including a buoyant float portion slidably received in said recess.

15. Apparatus as defined in claim 9 wherein the said pneumatic pressure flow means subjects the interior of the measuring vessel to vacuum to fill the vessel with a supply of liquid, the top of the measuring vessel being in the form of a cover, said cover being provided with a drilled passage intersecting a chamber, said passage being adapted to be connected with a source of pressurized air flow and there being a nozzle in said passage.

16. Apparatus as defined in claim 9 wherein said unitary float valve means moves from buoyed position to unbuoyed position in response to venting of the interior of the measuring vessel through said discharge conduit means.

17. A liquid dosing apparatus which comprises the combination of an airtight reservoir containing a supply of the liquid to be dispensed, an airtight measuring vessel from which a predetermined quantity of the liquid is to be dispensed, first conduit means connecting the reservoir to the measuring vessel for unidirectional flow of liquid from the reservoir into the measuring vessel in response to vacuum conditions in the measuring vessel and pressure conditions in the reservoir, second conduit means leading from a predetermined point within the interior of the measuring vessel for dispensing liquid unidirectionally from the measuring vessel in response to pressure conditions exceeding atmospheric pressure in the measuring vessel, third conduit means for delivering pressurized air and air from the interior of the measuring vessel into said reservoir, and valve means including a float located above said predetermined point for closing said third conduit means in response to rising liquid level in said measuring vessel to terminate withdrawal of air from the interior of the measuring vessel while subjecting the interior thereof to the inflow of pressurized air, said valve means including a valve body and the third conduit means including a valve seat cooperable with the valve body to maintain the valve means in closed relation to the third conduit means so long as the float has been raised by the liquid and pressurized air continues to be delivered, and pneumatic pressure flow means communicating with said measuring vessel to create said vacuum and pressurization conditions therein depending on the positioning of said valve means with respect to said valve seat.

* * * * *